Nov. 28, 1967  H. F. HERTWIG  3,354,920
BACON SLICING APPARATUS
Filed Aug. 2, 1965
7 Sheets-Sheet 1

Fig. I

INVENTOR.
HENRY F. HERTWIG
BY
ATTORNEY.

Fig. 4

INVENTOR.
HENRY F. HERTWIG
BY
ATTORNEY.

Nov. 28, 1967 H. F. HERTWIG 3,354,920
BACON SLICING APPARATUS
Filed Aug. 2, 1965 7 Sheets-Sheet 5

INVENTOR.
HENRY F. HERTWIG
BY
ATTORNEY.

United States Patent Office 3,354,920
Patented Nov. 28, 1967

3,354,920
BACON SLICING APPARATUS
Henry F. Hertwig, Naperville, Ill., assignor to Swift & Company, Chicago, Ill., a corporation of Illinois
Filed Aug. 2, 1965, Ser. No. 476,617
10 Claims. (Cl. 146—95)

ABSTRACT OF THE DISCLOSURE

A slicing machine for continuously delivering bacon slabs, or the like, into a revolving blade comprises an endless conveyor feed and an overhead tractor device to urge the slabs forwardly. A plurality of brake members are spaced between the tractor and blade, and similarly, a brake is positioned to the side of the slab, to hinder the slab from being pulled into the blade by action of the latter and to insure positive controlled advance at the conveyor speed. The tractor is resiliently mounted with the two ends independent so as to accept succeeding slabs of varying thickness while maintaining a downward and forward force on the forwardmost slab.

---

This invention relates to an improved slicing apparatus. more specifically, the present invention is directed to an improved continuous feed mechanism in a bacon slicing machine.

Bacon slicing equipment in use today employ ram-type feeding apparatus to advance bacon slabs into the path of a rotating knife blade that cuts slices transversely across the slabs. In operation, such apparatus must be returned to the initial starting position at the completion of the feeding and slicing of each bacon slab, whereupon the next succeeding slab may be inserted in the machine. Also, this type of apparatus must be manually controlled to advance each slab quickly until it is in a position for the first slice to be taken whereupon it may be substantially automatically operated without further careful attention only until the slab is nearly completely sliced. Some machines, upon completing forward feed, return automatically to the starting position. All reciprocal machines, however, require a substantial amount of returns and reloading time.

Very often, bacon slicing machines will not efficiently sever the very last or tail portion of a slab. The latter difficulty is due to the fact that the geometry of the blade tends to draw product into its path, and unless there is a substantial weight of bacon reacting against this tendency, or unless the feed ram effectively grips the tail of the bacon slab, the end piece of the bacon will be drawn incorrectly and overly rapidly through the blade. Heretofore some apparatus have lessened this problem by physically engaging the trailing end of the slab with the further disadvantage that a portion of the tail end will be withdrawn with the feed ram.

Thus it will be seen that most slicers are inefficient with regard to both effective use of operating time and loss of a portion of product as low quality slices.

There have been proposals to feed bacon continuously to a rotating slicer blade by abutting successive slabs and thus feeding a continuous stream of slabs on an endless conveyor. It is not known, however, that any such proposal has heretofore been demonstrated to be successful on a commercial scale. The difficulty with such proposals is again the tendency of the slicer blade to draw the end portions uncontrollably into the bladepath. With continuous type proposals, this problem becomes more pronounced as there is no opportunity to grip or impale the end piece on the feed ram.

Accordingly, it is the principal object of the present invention to provide an improved slicer feed that overcomes, to substantial degree, the aforementioned disadvantages of previous slicers.

It is another object of the present invention to provide an improved continuous type feed apparatus, for a slicing machine, that provides a high degree of control over all portions of successive slabs of material to be sliced up to the point at which the material reaches the path of a slicer blade.

It is a further object of the present invention to provide an improved slicing machine having a continuous feed wherein the leading portion of the bacon approaching the knife blade is positively held and controlled at all leading surfaces and edges so as to be restrained against unregulated movement into the path of the slicer blade.

Generally speaking, the present invention is applied to a slicing machine having a rotary slicing blade cooperating with a blade anvil across which slabs of material are moved forwardly into the path of the blade. The improved feeding mechanism is basically comprised of an endless conveyer, at the level of the anvil, and an overhead tractor mechanism, above a portion of the conveyor, to positively grip and advance slabs toward said blade against the reaction of a plurality of braking means positioned above and at the side of the path of the material between the tractor means and the blade, such braking means being positioned very closely adjacent the path of the blade and opposite stationary anvil and side guide members. A preferable form of the invention includes a pair of successive braking means located to engage the upper surface of the slab. Each of the braking means forcefully contacts the exposed surfaces of the bacon slab to hinder movement of the slab toward the blade, whereby movement into the blade is accomplished substantially only by the endless conveyor and tractor means.

Further objects and advantages of the present invention will become apparent upon reading the following specification in conjunction with the drawings wherein.

Referring more specifically to the preferred embodiment shown in the drawings, the form of the slicer generally 10 is substantially well known, having a machine bed 11 with an upright blade housing 12 and vertical frame 13 having an open throat for the passage of bacon, at the forward end thereof. The blade housing includes a hinged access door 14, opening forwardy of the machine, that encloses the major portion of a rotatable blade 15. The blade 15 is mounted upon a shaft 16 rotatably supported in a bearing 17 in the vertical frame 13.

A tail frame 18 at the rear end of the machine is supported, cantilever style, from one side of the machine bed 11 and contains a rear bearing 19 for the blade shaft 16. An electric motor 20 is mounted at one side of the machine bed 11 and is connected to drive the blade shaft 16 by well known means such as belts and pulleys (not shown).

The rotary blade 15 is positioned to shear slices from material supported upon an anvil 22 at the throat and forwardmost end of the machine bed 11. The anvil 22 is elevated somewhat above the machine bed proper upon side frames 23, and a side guide 24 extends the length of the machine along one side and to above the anvil. A bacon slab is held against the anvil 22 and side guide 24 while being advanced through the throat into the path of the rotary knife. The preceding described apparatus is substantially conventional and well known in the art. The following described portions of the apparatus, however, were devised for the present invention.

Bacon slabs are advanced to the anvil 22 by an endless conveyor generally 25 extending substantially the full length of the slicer machine bed 11. This conveyor is constructed of a plurality of transverse cleats 26 mounted upon a pair of endless chains 27 which in turn are each trained about drive sprockets 28 and idler sprockets, not shown. The drive sprockets 28 are located at the forward end of the conveyor and are secured by keys or the like to a drive shaft 30 that extends out one side of the machine to a power mechanism to be subsequently explained. The idler sprockets are rotatably mounted on a tail shaft 31 at the rear end of the machine bed 11. A pair of chain support rails 32 are positioned directly beneath and in sliding contact with the upper run of endless chains 27 and are held in position by a pair of rods 33–34 secured to the side frame 23. These rails 32 support the endless chains 27 throughout the length of the upper run to provide a substantially flat conveyor surface formed by the transverse cleats 26.

The endless conveyor 25 is powered by a hydraulic motor 37 which in turn is driven by a hydraulic pump 38 connected to the electric motor 20. A gear reducer 39 is directly connected to the conveyor drive shaft 30 and is also connected to the hydraulic motor 37 by a coupling 40.

Figure 3:
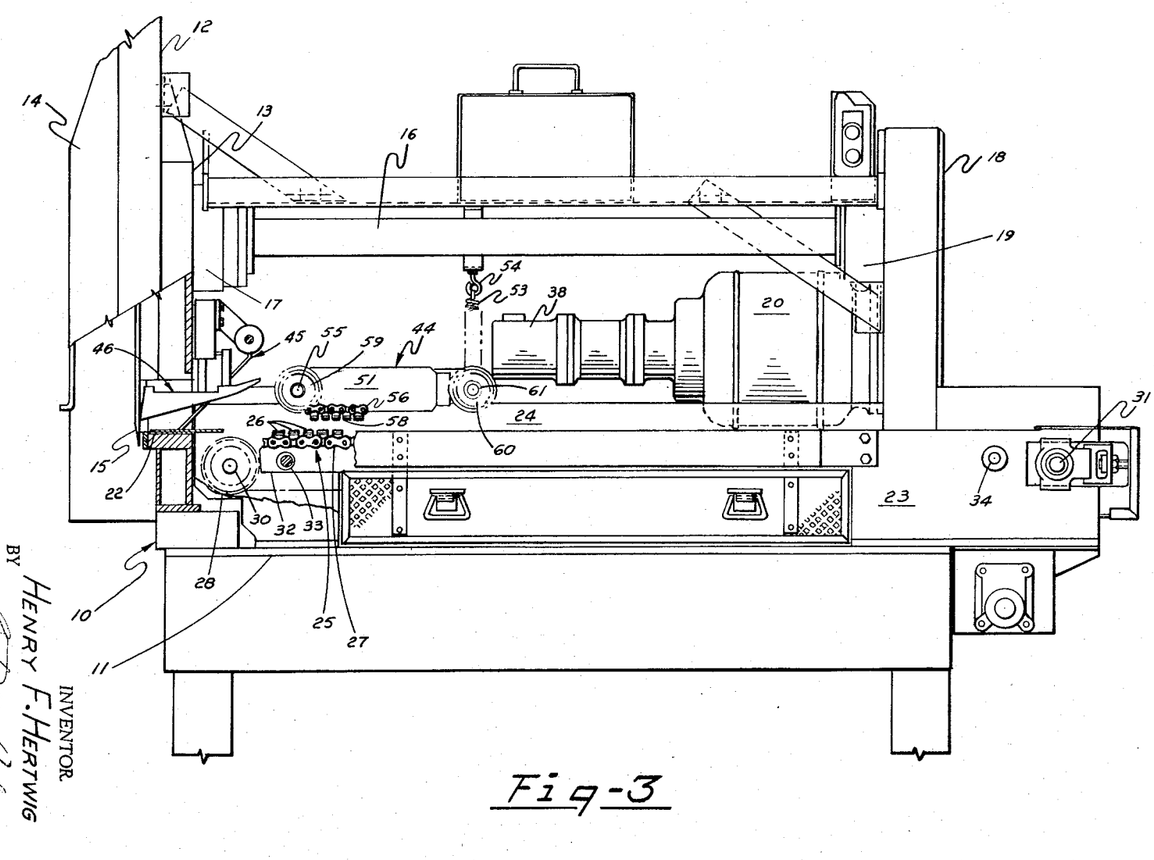
FIGURE 3 is an elevation view taken from one side of the apparatus of FIGURE 2 with certain portions removed and broken away for clarity.
Figure 6:
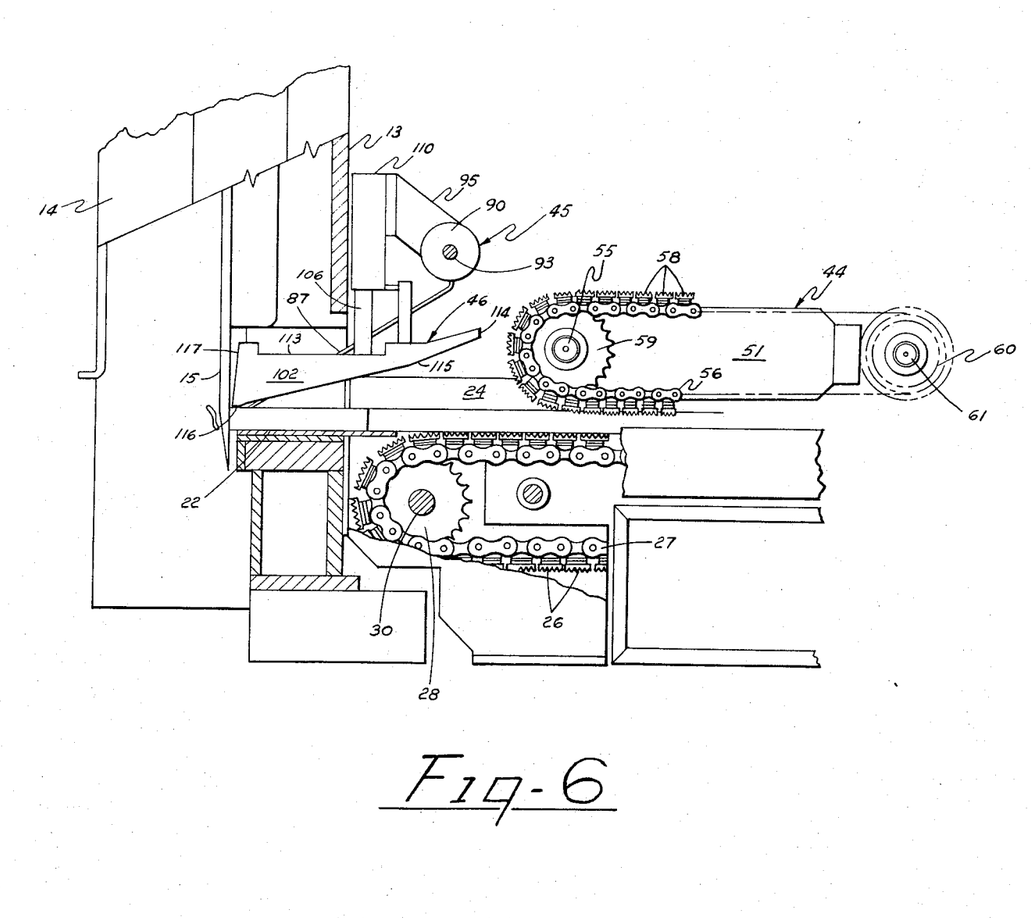
FIGURE 6 is a detailed side view of a portion of the apparatus shown in FIGURES 3 and 4 with certain parts removed and showing the present invention in operation.

It may be seen in FIGURES 3 and 6 that the anvil 22 and the upper run of endless conveyor cleats 26 are so related as to present a substantially continuous surface. Preferably, the endless conveyor is extended as closely as possible to the path of the knife blade 15. However, due to the physical structure of the machine it has been found that the center line of drive sprocket 28 must be spaced about 6 inches rearwardly of the knife blade. Accordingly, the anvil 22 extends approximately that distance rearwardly.

Normally, bacon slabs are carried forward on the endless conveyor generally 25 in a substantially continuous stream of slabs abutting end to end. Accordingly, the last several inches of a given slab will be pushed across the anvil 22 by the next succeeding abutting slab. However, the action of the knife blade 15 will tend to pull approximately the last inch of bacon slab forwardly at a rate faster than the conveyor. If this occurs porper slicing will be disrupted as the feed rate is carefully controlled to both produce slices of desired thickness and also to periodically halt the feed to produce intervals between groups of slices of a desired weight or number. Accordingly, a combination of apparatus has been carefully devised for location above the endless conveyor 25 and anvil 22 to positively control the advance of all portions of bacon slab at the rate of the conveyor 25 and resist any tendency of the blade pulling the slab forward.

To accomplish this, I have provided, in the following order in the direction of feed, an overhead feed tractor generally 44 which is positioned above the forward end of the conveyor generally 25, overhead brake means including a first brake means generally 45 that is located to engage the upper surface of a slab beyond the endless conveyor 25 and exert a downward and rearward force thereon, and preferably a second brake means generally 46 located very closely adjacent the path of the blade 15 to also contact the upper surface of a bacon slab at points just prior to entering the path of the blade to apply a downward pressure and frictional drag on the bacon slab. It is also necessary to provide a side brake means generally 47 to contact the leading side edge of the slab to frictionally retard any tendency for the slab to be turned askew on the anvil 22. In effect, the overhead tractor generally 44 and endless conveyor generally 25 cooperate to positively and precisely advance a continuous succession of slabs at a carefully controlled rate and to also hold the slabs flat upon the conveyor and anvil 22. The plurality of brake means 45, 46 and 47 cooperate to retard forward movement of each slab up to the very point at which it enters the path of the knife blade, the combined retarding effect exceeding the tendency of the knife to pull slabs forwardly, and is overcome only by the positive feed applied through successive slabs by the overhead tractor 44 and endless conveyor 25.

Figure 1:
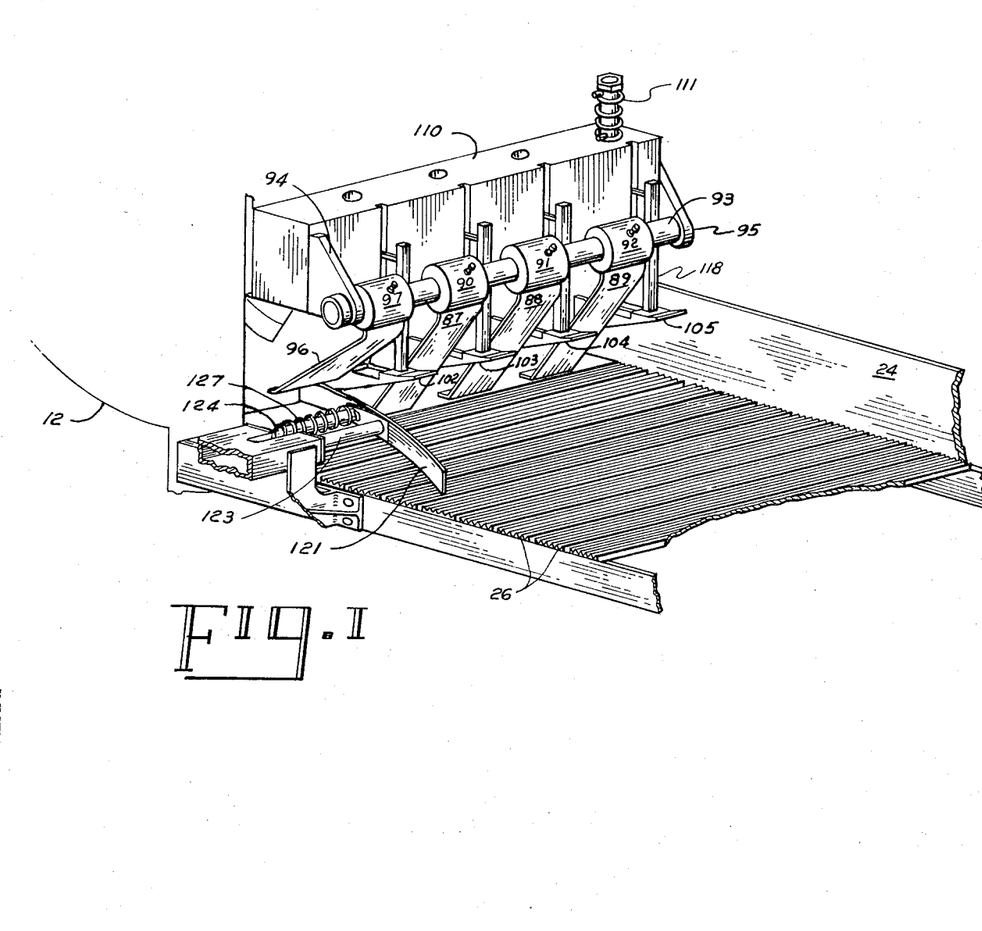
FIGURE 1 is a perspective view of a portion of the preferred form of the present invention.
Figure 2:
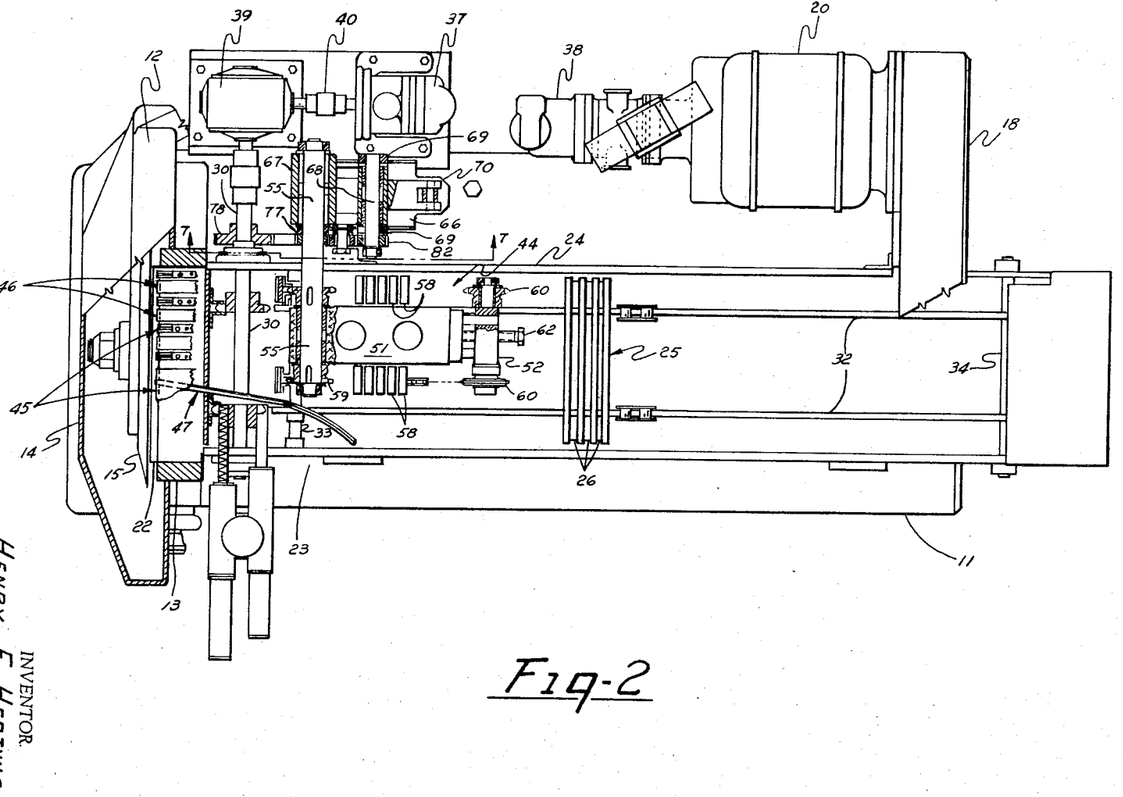
FIGURE 2 is a plan view of a slicing machine including the apparatus of FIGURE 1 with certain portions removed and broken away for clarity.
Figure 7:
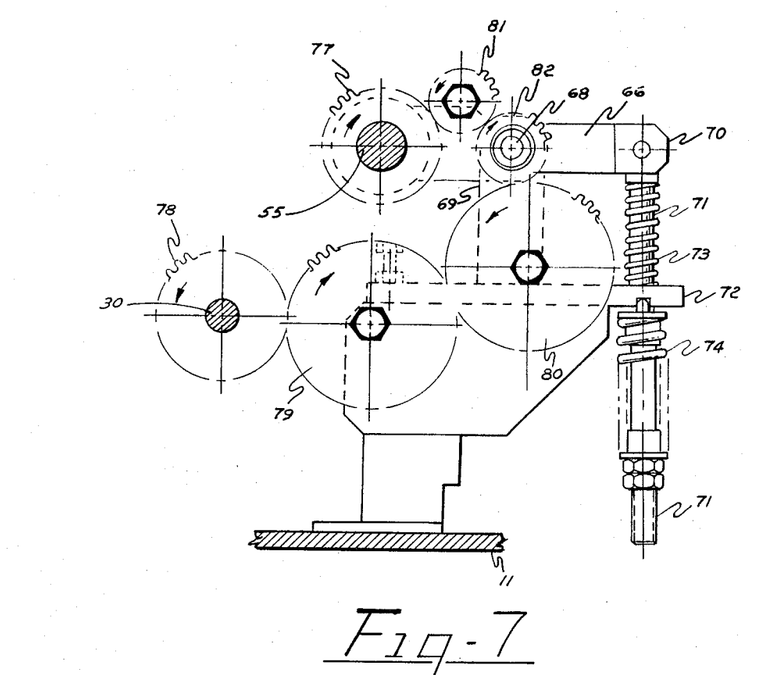
FIGURE 7 is a partial sectional view showing details of a portion of the tractor drive train taken at line 7—7 in FIGURE 2.

Concerning the preferred construction details of the aforementioned apparatus, the overhead feed tractor 44 is fully illustrated in FIGURES 2, 3 and 7. This means comprises a longitudinal body 51 and a tail stock 52 reciprocally mounted thereon. The tail stock 52, and body 51, is floatingly supported by a tension spring 53 connected to an eye bolt 54 secured to an overhead portion of the apparatus frame. A power drive shaft 55 is journaled in the forward end of body 51 and extends beyond a side of the machine bed 11 parallel to the conveyor drive shaft 30. The tractor drive shaft 55 is supported to be swingable vertically in a manner that will be subsequently made clear.

A pair of endless chains 56, each bearing relatively small transverse cleats 58, are trained about drive sprockets 59 on the drive shaft 55, and about idler sprockets 60 which in turn are freely mounted on stub shafts 61 secured to the tail stock 52. The entire tractor assembly is aligned with the endless conveyor 25 and is of a width, between chains, slightly less than the width of the endless conveyor 25 and it is positioned closely adjacent the side guide 24. A tension adjustment bolt 62 is provided between the tail stock 52 and body 51 to adjust the distance between the drive shaft 55 and stub shafts 61.

The tractor drive shaft 55 is mounted to be freely movable vertically by supporting the extended end of drive shaft 55 in a pivotally mounted yoke 66. A sleeve bearing 67 extends through the forward end of the yoke 66 and receives the drive shaft 55. In turn the yoke swings upon a pivot pin 68 secured to an upright stanchion 69 mounted upon the machine bed 11. A clevis 70 at the rear end of the yoke 66 is hinged to a force rod 71 that in turn extends through an opening in a middle support plate 72 which is horizontally secured to the stanchion 69. An upper compression spring 73 is mounted between clevis 70 and support plate 72 so as to react against clockwise rotation of the yoke 66 about pivot pin 68 (as seen in FIGURE 7). Another compression spring 74 is mounted concentrically about rod 71 between the lower end thereof and the underside of support plate 72 to react against counterclockwise rotation of the yoke 66.

Force rod 71 and compression springs 73–74 are adjusted to normally position the tractor generally 44 at a slight spacing above the endless conveyor 25. Since the tail end of the tractor is separately and floatingly suspended on tension spring 53, it is free to move up and down and receive succeeding slabs between it and the endless conveyor regardless of slab thickness. However, due to the compression spring arrangement tending to hold the drive shaft 55 and forward end of tractor 44 in a closely spaced position, all slabs, regardless of the thickness, will be positively engaged with substantially uniform pressure by the forward end of the tractor endless chains and cleats 58.

It is, however, necessary to drive the tractor chains at exactly the same speed as the endless conveyor regardless of the vertical position and attitude to which the tractor 44 may be pushed by advancing bacon slabs. The drive train devised for this purpose is shown fully in FIGURE 7 and includes a driven gear 77 fastened to the tractor drive shaft 55, and a drive gear 78 fastened to the conveyor drive shaft 30. These two gears are preferably sized to drive the tractor cleats 58 at the same speed that cleats 26 of conveyor 25 are driven. Two intermediate pairs of gears 79, 80 and 81, 82 complete the drive train between the driven gear 77 and drive gear 78, each gear of a given pair being of equal size (however, the two pairs may be of different size).

Gears 79, 80 are rotatably mounted on stub shafts or the like secured to the middle support plate 72. The pair of gears 81, 82, however, are mounted on stub shafts secured to yoke 66; and specifically gear 82, which also mates with gear 80, is mounted on the pivot pin 68 of yoke 66, and accordingly, does not move lineally with respect to gear 80. It will accordingly be seen that the drive train connecting gears 77, 78 will be operative and in mesh regardless of the attitude of yoke 66.

Beyond the overhead feed tractor 44, the first brake means 45 comprises a plurality of spring steel wiper fingers 87, 88, 89 spaced transversely above the conveyor 25 and anvil 22 and mounted so that the point of contact of the ends of the fingers upon the upper surface of the slabs will be above the anvil and within about 2 inches of the slicer blade 15. The fingers are flexible arcuately and it will be understood that the thicker slabs will be contacted progressively closer to the blade 15. Each wiper finger 87–89 extends from a mounting collar 90, 91 and 92, respectively. Each of the latter in turn is rotatable on a bolt shaft 93, and contains a helical spring (not shown) connected between the shaft and the collar to urge the latter to rotate the fingers downwardly toward the anvil. The shaft 93 in turn is rotatably held in a pair of bearing mounts 94, 95, extending rearwardly of the vertical frame 13 of blade housing 12, and may be rotated to compress the respective helical springs until the desired tension is exerted on fingers 87–89. The shaft 93 is then locked in position by a suitable lock nut or latch or the like. A further finger 96 is provided at one side of the fingers 87–89, opposite side guide 24, and is similarly biased by a collar 97 and spring on shaft 93. This finger is broader than fingers 87–89 and its arcuate movement toward the anvil 22 is limited by a suitable stop or the like (not shown) to maintain it spaced above the anvil 22 and above the path of the side brake means generally 47. The broad width of finger 96 will also serve to effectively contact even the widest bacon slabs that may be processed. Preferably shaft 93 is set so that the ends of fingers 87–89 and 96 each exert a force of about 5–6 pounds downward.

It will be observed that the arcuate motion of wiper fingers 87–89 and 96 exerts a force against the upper surface of bacon slabs in a direction both downwardly and rearwardly, and thus tends not only to hold the slabs against the anvil 22, but also tends to react against movement of the slab toward the knife blade 15.

The second brake means generally 46 is preferably comprised of a plurality of presser feet 102, 103, 104, 105 that are located forwardly of the wiper fingers 87–89 and also interspaced therewith. Each presser foot is reciprocably supported upon separate rods 106, 107, 108, 109 respectively, that are vertically reciprocal in a guide block 110 secured to the rear side of the vertical frame 13 and drilled to receive the rods. Preferably each foot exerts a downward force of about 1¾–2½ pounds; and this is provided entirely by the weight of the feet in the illustrated device. However, it is also desirable to bias the presser foot 105, adjacent side guide 24, to exert an additional force of 1–2 pounds downward adjacent the guide 24 to counter a tendency of softer or warmer bacon to creep upward at that side due to the compressive forces applied by the side brake means 47 and the shearing action of blade 15. This may be conveniently provided by mounting a tension spring 111 concentrically about an upward extension of the rod 109 to urge the foot 105 downward.

The forward ends of the presser feet are positioned as close as possible to the path of the knife blade 15. A preferable form of the presser feet is seen in FIGURE 6 wherein foot 102 is shown to include a flat top portion 113 to which the respective rod 106 is secured. Rearwardly, the presser foot 102 terminates in a raised tail portion 114 from which an undersurface 115 angles downwardly and forwardly to a flattened forward toe 116 whereat the total force of the foot is applied to the leading edge of a bacon slab. A forward face 117 of the presser foot 102 is angled slightly to the rear so as to present a minimum surface that could possibly interfere with the knife blade 15. Each foot is stabilized against twisting by a vertical guide 118, mounted on this tail portion 114, which is trained in a vertical groove on the rear face of guide block 110. An advantage of the preferred form of the presser foot is that it will receive variations in slab thickness and succeeding slabs of increased thickness without raising the forward toe 116 from the last remaining portion of a preceding slab. Thus, the portion of the slab at a position just prior to entering the path of the slicer blade 115 is positively pressed downwardly and frictionally retarded from uncontrolled movement into the blade path.

Figure 4:
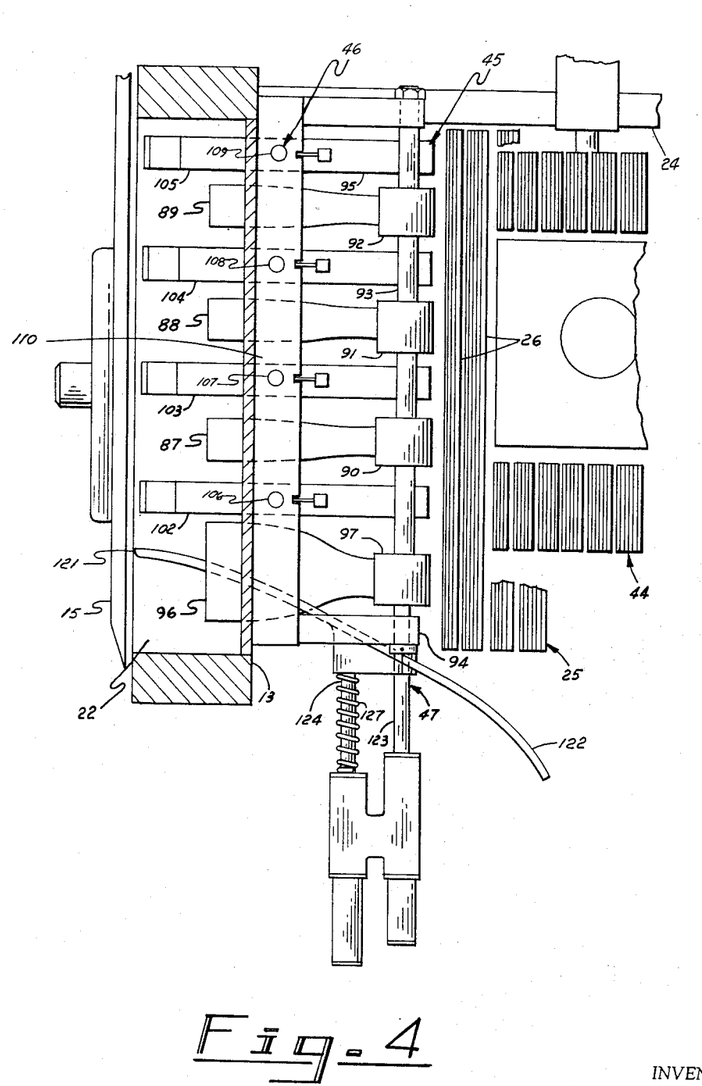
FIGURE 4 is an enlarged partial plan view of a portion of the apparatus showing the various brake means.
Figure 5:
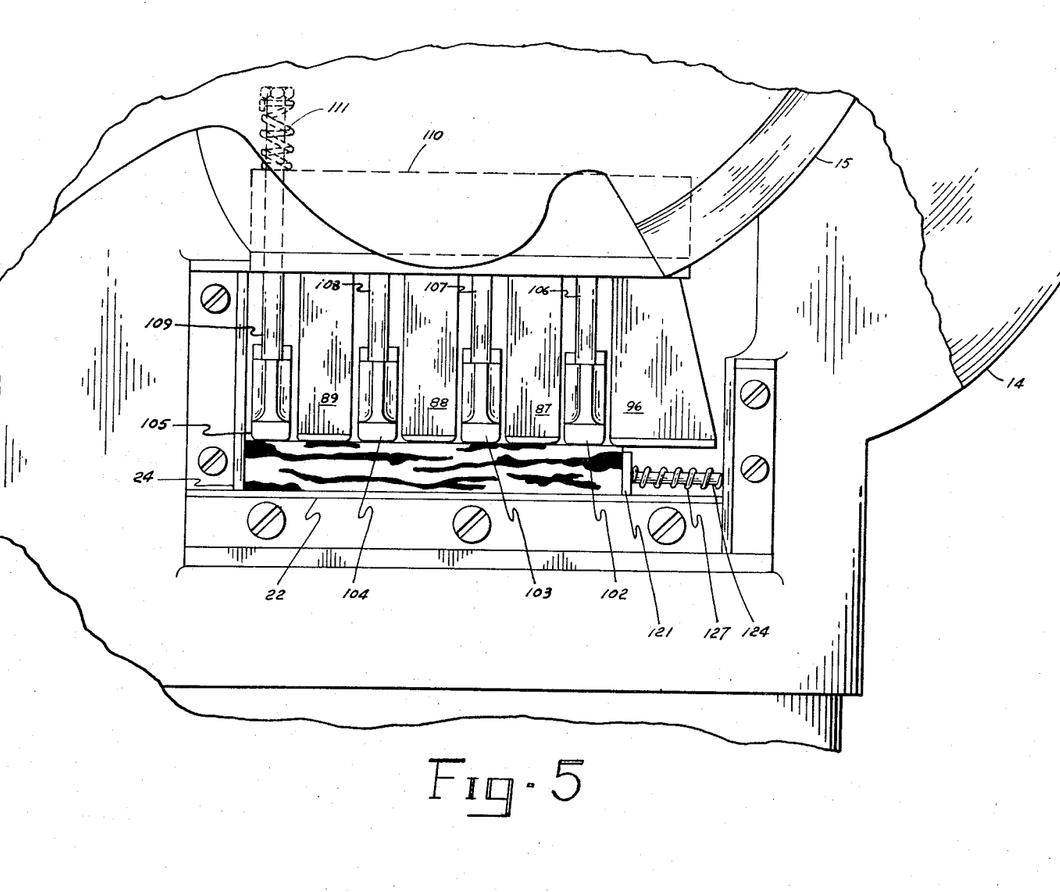
FIGURE 5 is a front elevational view of the apparatus.

The present apparatus also includes a side brake means generally 47 shown in FIGURES 2, 4 and 5 to be comprised of a bar 121 set at an angle to the path of bacon slabs and positioned opposite the side guide 24. Desirably, the bar 121 has an arcuate rear portion 122 to readily receive succeeding slabs of relatively greater width. The bar 21 is held to be reciprocable laterally of the bacon slab path and beneath the broad finger 96 by a pair of guide rods 123, 124, suitably supported by sleeve bearings 125, 126 respectively. A compression spring 127 is mounted concentrically upon one guide rod, such as rod 124, between the bar 121 and respective sleeve 126. The compression spring 127 urges the bar inwardly with sufficient force so as to urge the forward edge thereof under about 5–6 pounds force against the leading side edge of each bacon slab closely adjacent the path of blade 15 and at approximately the same plane of engagement as the second brake means generally 46.

In operation, a continuous succession of slabs are placed upon the endless conveyor 25 by an operator who initially forces each succeeding slab into abutting engagement with the preceding slab at the rear portion of the conveyor 25. These slabs advance to a position beneath the tractor generally 44 whereby they are more positively urged forward and prevented from upward buckling. Thereafter, the slabs continuously slide across anvil 22 whereupon they are successively engaged at the upper side by the first and second braking means; and also preferably engaged on a side edge by the side braking means. All braking means act to hold the slabs in position against the anvil 22 and side guide 24 and to retard any extraneous forward motion of the slabs except that motion positively applied by the conveyor 25 and overhead tractor 44. During operation, the advancement of slabs can be temporarily halted to either space slice groupings or to enable other adjustments without upsetting the slicing operation. At the end of a day's operation, only the last portion of the last slab will not be forced automatically through the slicer, since no advancing force will be applied thereto upon once passing beyond the conveyor 25. This portion of the last slab is usually saved for the following day's operation.

The foregoing described apparatus is also compatible with various automatic bacon feed controls designed to pause between slice groupings of a desired number or weight. This is accomplished by known means usually connected between the hydraulic pump 38 and hydraulic motor 37. Various examples of such feed controls are shown in prior patents such as Patents Nos. 3,133,571 and 3,105,533 to Hensgen et al.; 3,142,323 to Metzler, 3,010,499 to Dahms; and Patents Nos. 3,015,350, 3,133,474 and 3,133,574 to Reichel et al.

Obviously, many modifications and variations of the invention as hereinbefore set forth may be made without departing from the spirit and scope thereof. For instance it is possible to obtain credible results by deleting the first overhead braking means generally 45 and increasing the number of presser feet constituting the second brake means generally 46 so as to provide a substantially continuous row of such feet to engage the entire upper leading edge of the bacon. Therefore only such limtations could be imposed as are indicated in the appended claims.

I claim:

1. In a slicing machine having a rotating slicer blade and a blade anvil and adjacent side guide across which a slab of material is moved forwardly into the path of the blade, the improvement comprising: an endless conveyor rearwardly of said anvil; an overhead feed tractor spaced above said endless conveyor; a plurality of brake means arranged laterally above said anvil between said tractor and the knife blade, said brake means exerting a downward force on a slab above said anvil to restrain forward movement of said slab; and a side brake means positioned above said anvil opposite said side guide and biased to exert a force against a side of said slab to further restrain forward movement of said slab.

2. In a slicing machine having a rotating slicer blade and a blade anvil and adjacent side guide across which a slab of material is moved forwardly into the path of the blade, the improvement comprising: an endless conveyor rearwardly of said anvil, said conveyor being formed of a plurality of lateral cleats and the upper run thereof positioned at the level of said anvil and powered to move forwardly toward said anvil; an overhead feed tractor spaced above said endless conveyor, said tractor being comprised of a pair of endless cleats parallel with said endless conveyor the lower runs of which are powered to move forwardly, and said tractor being vertically movable and biased downwardly at the forward end thereof and floatingly suspended at the rear end thereof for independent vertical movement whereby to accommodate two abutted slabs of varying thicknesses at the same time while exerting a positive downward and forward force on the forwardmost slab; a plurality of brake means arranged laterally above said anvil to contact the slab closely adjacent said blade so as to exert a downward pressure and frictional drag on the material at a point just before entering the path of said blade; and a side brake means positioned above said anvil opposite said guide and biased to exert a force against a side of said slab, both of said brake means acting to restrain forward movement of said slab.

3. In a slicing machine having a rotating slicer blade and a blade anvil across which a slab of material is moved forwardly into the path of the blade, the improvement comprising: an endless conveyor rearwardly of said anvil, said conveyor being formed of a plurality of lateral cleats the upper run thereof positioned at the level of said anvil and powered to move forwardly toward said anvil; an overhead feed tractor spaced above said endless conveyor, said tractor being comprised of a pair of endless cleats parallel with said endless conveyor the lower runs of which are powered to move forwardly, and said tractor being vertically movable and biased downwardly at the forward end thereof and floatingly suspended at the rear end thereof for independent vertical movement whereby to accommodate two abutted slabs of varying thickness at the same time while exerting a positive downward and forward force on the forwardmost slab; a plurality of wiper fingers arranged laterally above said endless conveyor and anvil between said tractor and the knife blade, said wiper fingers being biased to pivot downwardly and rearwardly in an arc so as to exert a downward and rearward force on a slab above said anvil; and a plurality of presser feet arranged laterally above said anvil interspaced forwardly of said wiper fingers to contact the slab closely adjacent said blade so as to exert a downward pressure and frictional drag on the material at a point just before entering the path of said blade.

4. The apparatus of claim 3 including a side brake means positioned above said anvil and opposite a fixed side guide and biased to exert a force against a side of said slab to further restrain forward movement thereof.

5. The apparatus of claim 3 wherein said presser feet are each characterized as having an undersurface declining from a raised tail portion to a flattened engaging toe to accommodate oncoming slabs of different thickness without disengaging the toe from the preceding slab.

6. The apparatus of claim 5 wherein a fixed side guide is located adjacent said anvil to guide said slabs, and wherein one of said presser feet is located adjacent said guide and is biased to exert a greater downward pressure sufficient to retard any tendency of the slab material to creep upwardly at said side guide.

7. In a slicing machine having a rotating slicer blade and a blade anvil across which a slab of material is moved forwardly into the path of the blade, the improvement comprising: an endless conveyor rearwardly of said anvil; an overhead feed tractor spaced above said endless conveyor; a plurality of first brake means arranged laterally above said anvil between said tractor and the knife blade, said first brake means being biased to exert a downward and rearward force on a slab above said anvil; a plurality of second brake means arranged laterally above said anvil interspaced forwardly of said first brake means to contact the slab closely adjacent said blade so as to exert a downward pressure and frictional drag on the material at a point just before entering the path of said blade; and a side brake means positioned at an angle at one side of said anvil and extending closely adjacent said blade, said brake means being biased across said anvil to exert a pressure against the leading side edge of a slab so as to retard any tendency of said slab to be turned askew by said blade.

8. In a slicing machine having a rotating slicer blade and a blade anvil and adjacent side guide across which a slab of material is moved forwardly into the path of the blade, the improvement comprising: an endless conveyor rearwardly of said anvil, said conveyor being formed of a plurality of lateral cleats and the upper run thereof positioned at the level of said anvil and powered to move forwardly toward said anvil: an overhead feed tractor spaced above said endless conveyor, said tractor being comprised of a pair of endless cleats parallel with said endless conveyor cleats the lower runs of which are powered to move forwardly, and said tractor being vertically movable and biased downwardly at the forward end thereof and floatingly suspended at the rear end thereof for independent vertical movement whereby to accommodate two abutted slabs of varying thickness at the same time while exerting a positive downward and forward force on the forwardmost slab; a plurality of wiper fingers arranged laterally above said anvil between said tractor and the knife blade, said wiper fingers being biased to pivot downwardly and rearwardly in an arc so as to exert a downward and rearward force on a slab above said anvil; a plurality of presser feet arranged laterally above said anvil interspaced forwardly of said wiper fingers to contact the slab closely adjacent said blade so as to exert a downward pressure and frictional drag on the material at a point just before entering the path of said blade, each of said presser feet having an under-surface declining from a raised tail portion to a flatttened engaging toe to accommodate oncoming slabs of different thickness without disengaging the toe from the preceding slab; and a side engaging bar positioned at an angle at one side of said anvil opposite said side guide and extending closely adjacent said blade, said side engaging bar being biased across said anvil to exert a pressure against the leading side edge of a slab so as to retard any tendency of said slab to be turned askew by said blade.

9. The apparatus of claim 8 wherein one of said presser feet is located adjacent said side guide and is biased to exert a greater downward pressure sufficient to retard any tendency of the slab material to creep upwardly at said guide.

10. The apparatus of claim 8 wherein the wiper fingers are adjustable as to the degree of force exerted, and the finger spaced furthest from said side guide is substantially broader than the other fingers to contact the extremity of relatively wider slabs, said last mentioned finger being limited in downward movement so as to remain clear of said side engaging bar which is located to be movable across said anvil and beneath said last mentioned finger.

References Cited

UNITED STATES PATENTS

| | | | |
|---|---|---|---|
| 2,060,540 | 10/1936 | Straeten | 146—94 X |
| 2,113,851 | 4/1938 | McKee et al. | 146—94 X |
| 2,126,458 | 8/1938 | Englen | 146—94 |
| 2,347,818 | 5/1944 | Folk | 146—94 X |
| 3,162,226 | 12/1964 | Toby et al. | 146—95 |

JAMES M. MEISTER, *Primary Examiner.*